United States Patent
Heggebø et al.

(10) Patent No.: US 12,294,220 B2
(45) Date of Patent: May 6, 2025

(54) DYNAMIC POWER MANAGEMENT

(71) Applicant: Autostore Technology AS, Nedre Vats (NO)

(72) Inventors: Jørgen Djuve Heggebø, Olen (NO); Helge Steinbru Lauvsnes, Suldalsosen (NO)

(73) Assignee: AutoStore Technology AS, Nedre Vats (NO)

( * ) Notice: Subject to any disclaimer, the term of this patent is extended or adjusted under 35 U.S.C. 154(b) by 495 days.

(21) Appl. No.: 17/599,436

(22) PCT Filed: Mar. 19, 2020

(86) PCT No.: PCT/EP2020/057661
§ 371 (c)(1),
(2) Date: Sep. 28, 2021

(87) PCT Pub. No.: WO2020/200821
PCT Pub. Date: Oct. 8, 2020

(65) Prior Publication Data
US 2022/0181882 A1 Jun. 9, 2022

(30) Foreign Application Priority Data

Mar. 29, 2019 (NO) .................................. 20190430

(51) Int. Cl.
*B65G 1/04* (2006.01)
*H02J 3/32* (2006.01)
(52) U.S. Cl.
CPC .............. *H02J 3/32* (2013.01); *B65G 1/0492* (2013.01); *H02J 2300/20* (2020.01)
(58) Field of Classification Search
CPC .......... H02J 3/32; H02J 2300/20; H02J 3/322; G06F 1/26; G06Q 10/08; B65G 1/0464;
(Continued)

(56) References Cited

U.S. PATENT DOCUMENTS

2004/0268166 A1 12/2004 Farkas et al.
2014/0052306 A1* 2/2014 Motobayashi ............ H02J 9/06
307/23
(Continued)

FOREIGN PATENT DOCUMENTS

CN 103246335 A 8/2013
CN 103457311 A 12/2013
(Continued)

OTHER PUBLICATIONS

International Search Report issued in PCT/EP2020/057661 on Jun. 8, 2020 (4 pages).
(Continued)

*Primary Examiner* — Santosh R Poudel
(74) *Attorney, Agent, or Firm* — Baker Botts L.L.P.

(57) ABSTRACT

Power management system for a container-handling vehicle, with a rechargeable power source, for handling storage containers in an automated storage/retrieval system includes a charging station for recharging the rechargeable power source of the container-handling vehicle, a power supply for delivering power to the storage system, a power monitoring device coupled to the power supply, and a control system for controlling the operation of the automated storage/retrieval system. The power monitoring device monitors available power from the power source entering the automated storage/retrieval system and communicate a signal to the control system indicative of the available power. The control system is responsive to that signal and manages power consumption through modifying the operation of the container-handling vehicle and/or the charging station to reduce power consumption of the respective container-handling vehicle and/or the charging station in the event that the signal indicates that the available power has dropped below a threshold level.

9 Claims, 5 Drawing Sheets

(58) Field of Classification Search
CPC ..... B65G 1/0492; B65G 1/0478; Y02T 10/70; Y02T 10/7072; Y02T 90/12
See application file for complete search history.

(56) References Cited

U.S. PATENT DOCUMENTS

| | | | | |
|---|---|---|---|---|
| 2014/0062401 A1* | 3/2014 | Gadh | ................ | B60L 53/67 |
| | | | | 320/109 |
| 2014/0203077 A1* | 7/2014 | Gadh | ................ | B60L 53/30 |
| | | | | 235/382 |
| 2015/0069970 A1* | 3/2015 | Sarkar | ............... | B60L 53/53 |
| | | | | 320/109 |
| 2015/0298565 A1* | 10/2015 | Iwamura | ............. | G06Q 10/04 |
| | | | | 701/22 |
| 2016/0325634 A1* | 11/2016 | Foldesi | ............. | H02J 7/0042 |
| 2017/0129702 A1* | 5/2017 | Hognaland | ........ | B65G 1/0464 |

FOREIGN PATENT DOCUMENTS

| | | | |
|---|---|---|---|
| CN | 102272692 A | 8/2014 | |
| CN | 106662874 A | 5/2017 | |
| CN | 109328150 A | 2/2019 | |
| EP | 2669855 A1 | 12/2013 | |
| JP | 2004-123350 A | 4/2004 | |
| JP | 2013-021769 A | 1/2013 | |
| JP | 2016-015829 A | 1/2016 | |
| NO | 317366 B1 | 10/2004 | |
| NO | 340313 B1 | 3/2017 | |
| WO | 2012/138235 A2 | 10/2012 | |
| WO | WO-2013001501 A1 * | 1/2013 | .......... B60L 11/1816 |
| WO | 2015/185628 A2 | 12/2015 | |
| WO | 2015/193278 A1 | 12/2015 | |

OTHER PUBLICATIONS

Written Opinion of the International Searching Authority issued in PCT/EP2020/057661 on Jun. 8, 2020 (9 pages).
International Preliminary Report on Patentability from PCT/EP2020/057661 mailed on Jul. 22, 2021 (11 pages).
Norwegian Search Report issued in No. 20190430 mailed on Oct. 29, 2019 (2 pages).
Office Action issued in counterpart Japanese Patent Application No. 2021-557481 mailed on Nov. 21, 2023 (10 pages).
Zhou Shanlin, Notification of the First Office Action for Chinese patent application No. 202080025933.X, National Intellectual Property Administration, People's Republic of China, mailed Feb. 1, 2024, 18 pages (including translation).
Chinese Intellectual Property Administration (CNIPA), Search Report for Chinese patent application No. 202080025933.X, mailed Jan. 28, 2024, 6 pages (including translation).

* cited by examiner

DYNAMIC POWER MANAGEMENT

TECHNICAL FIELD

The present invention regards a system and a method for managing power consumption of an automated storage and retrieval system, and more particularly a system and method for managing power consumption of an automated storage and retrieval system by providing a modified operation of the automated storage and retrieval system during periods of lower power availability.

BACKGROUND OF THE INVENTION

FIG. 1 discloses a typical prior art automated storage and retrieval system 1 with a framework structure 100 and FIGS. 2 and 3 discloses two different prior art container handling vehicles 201, 301 suitable for operating on such a system 1.

The framework structure 100 comprises several upright members 102 and several horizontal members 103 which are supported by the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107. The storage grid 104 guards against horizontal movement of the stacks 107 of storage containers 106, and guides vertical movement of the containers 106, but does normally not otherwise support the storage containers 106 when stacked.

Each prior art container handling vehicle 201, 301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

In a storage grid 104, most of the grid columns 112 are storage columns 105, i.e. grid columns 105 where storage containers 106 are stored in stacks 107. However, a grid 104 normally has at least one grid column 112 which is used not for storing storage containers 106, but which comprises a location where the container handling vehicles 201, 301 can drop off and/or pick up storage containers 106 so that they can be transported to an access station (not shown) where the storage containers 106 can be accessed from outside of the grid 104 or transferred out of or into the grid 104. Within the art, such a location is normally referred to as a 'port' and the grid column 112 in which the port is located may be referred to as a 'port column' 119, 120. The transportation to the access station may be in any direction, that is horizontal, tilted and/or vertical. For example, the storage containers 106 may be placed in a random or dedicated grid column 112 within the storage grid 104, then picked up by any container handling vehicle and transported to a port 119, 120 for further transportation to an access station. Note that the term 'tilted' means transportation of storage containers 106 having a general transportation orientation somewhere between horizontal and vertical.

When a storage container 106 stored in the grid 104 disclosed in FIG. 1 is to be accessed, one of the container handling vehicles 201, 301 is instructed to retrieve the target storage container 106 from its position in the grid 104 and transport it to the drop-off port 119. This operation involves moving the container handling vehicle 201, 301 to a grid location above the storage column 105 in which the target storage container 106 is positioned, retrieving the storage container 106 from the storage column 105 using the container handling vehicle's 201, 301 lifting devices (not shown), and transporting the storage container 106 to the drop-off port 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in the grid 104, one of the container handling vehicles 201, 301 is instructed to pick up the storage container 106 from the pick-up port 120 and transport it to a grid location above the storage column 105 where it is to be stored. After any storage containers positioned at or above the target position within the storage column stack 107 have been removed, the container handling vehicle 201, 301 positions the storage container 106 at the desired position.

The removed storage containers may then be lowered back into the storage column 105 or relocated to other storage columns.

For monitoring and controlling the automated storage and retrieval system 1, e.g. monitoring and controlling the location of respective storage containers 106 within the grid 104, the content of each storage container 106, and the movement of the container handling vehicles 201, 301 so that a desired storage container 106 can be delivered to the desired location at the desired time without the container handling vehicles 201, 301 colliding with each other, the automated storage and retrieval system 1 comprises a control system which typically is computerized and which typically comprises a database for keeping track of the storage containers 106.

NO340313 B1 and WO2012138235 A2 displays solutions that are anticipated by the preamble in the independent claims.

A storage system like the one described above, consumes energy through e.g. charging of the power sources in the container handling vehicles. The charging of these power sources, usually Li-ion batteries, can happen on any given time of day since a storage system like this can be operative 24 hours a day all year around. If it is a large storage system with lots of container handling vehicles this can require a large amount of consumed energy.

In a normal power grid there are certain periods during the day where power consumption is higher than normal. During these periods there is a risk of overloading the power supply. A way of solving this problem can be to scale up the power supply to accommodate higher amounts of power, this however can be quite expensive and unnecessary since there is only during certain periods of the day the power supply is not sufficient.

Another solution can be to install local renewable power sources like solar cells. However, solar cells only work optimally during day time and if the weather conditions are right. Otherwise, the amount of power received from these types of sources is not reliable. Solar cells also have limited effect at certain places of the globe and at certain times of the year. Other local renewable power sources, like wind mills and water turbines, also have limitations. They are dependent on location and weather conditions to work.

It would therefore be desirable to solve the problems of overloading the power supply without having to scale it up.

SUMMARY OF THE INVENTION

The present invention is set forth and characterized in the independent claims, while the dependent claims describe other characteristics of the invention.

The invention is defined by a system for managing power consumption of an automated storage and retrieval system comprising a container-handling vehicle, with a rechargeable power source, for handling storage containers in the automated storage and retrieval system, a charging station for recharging the rechargeable power source of the container carrying vehicle, a power supply for delivering power to the storage system, a power monitoring device coupled to the power supply, a control system for controlling the operation of the automated storage and retrieval system, where the power monitoring device is arranged to monitor available power from the power source entering the automated storage and retrieval system and communicate a signal to the control system indicative of the available power, wherein the control system is arranged to be responsive to that signal and manage power consumption through being configured to modify the operation of the container-handling vehicle and/or the charging station to reduce power consumption of the respective container-handling vehicle and/or the charging station in the event that the signal indicates that the available power has dropped below a threshold level, thereby providing a modified operation of the automated storage and retrieval system during periods of lower power availability.

Further the control system can be configured to adjust the speed of the at least one container handling vehicle according to available power, wherein the speed is reduced during periods of lower power availability.

The power supply system can be arranged for providing power from local generated renewable energy and/or grid power.

The control system can control the number of charging stations that are operational by reducing the number of charging stations during periods of lower power availability, or the control system can adjust the charging power of the charging stations by reducing the charging power during periods of lower power availability. Also, the control system can direct the container handling vehicle to the charging station having the highest charging capability during lower power availability.

The invention is further described by a method for managing power consumption of an automated storage and retrieval system comprising a container-handling vehicle, with a rechargeable power source, for handling storage containers in the automated storage and retrieval system, a charging station for recharging the rechargeable power source of the container carrying vehicle, a power supply system for delivering power to the storage and retrieval system, a power monitoring device coupled to the power supply, a control system for controlling the operation of the automated storage and retrieval system, wherein the method comprises the following steps: monitoring available power from the power source entering the automated storage and retrieval system by means of the power monitoring device, communicating a signal to the control system indicative of the available power by means the power monitoring device, allowing the control system to react to said signal and manage power consumption through being configured to modify the operation of the container-handling vehicle and/or the charging station to reduce power consumption of the respective container-handling vehicle and/or the charging station in the event that the signal indicates that the available power has dropped below a threshold level, providing a modified operation of the automated storage and retrieval system during periods of lower power availability The invention is further defined by a computer program that when executed in a processor in a control system adjusts and adapts power consumption of a storage system, and an automated storage and retrieval system having its power consumption managed by a system for managing power consumption.

So, the power consumption can be reduced by adapting the charging strategy of the system. The adaptation of the charging strategies can be to reduce the need for recharging of the batteries during these periods. To reduce the need for recharging, the container carrying vehicles can be made to run at reduced speeds thereby reducing the need to recharge the battery onboard the vehicle.

Further the charging level of the charging stations can be reduced to lower the power consumption of the system during periods of insufficient power supply. Additionally, the system can direct vehicles with batteries that need charging during these periods to the charging station with the highest capacity.

The solution is therefore to install a power monitoring device in the power supply to always keep track of the available power. This information is communicated to the system which can adapt its power consumption accordingly. The system can also keep track of the periods of insufficient power supply to see if there are certain recurring periods during the day where there are insufficient power available. The system can use this information to adapt the power consumption to fit an upcoming period of low power supply. This can be to reduce the speed of the vehicles prior to a period of low power supply to extend the range of the battery on the vehicle and to charge batteries on vehicles before they normally would be charged.

DETAILED DESCRIPTION

Figure 1:
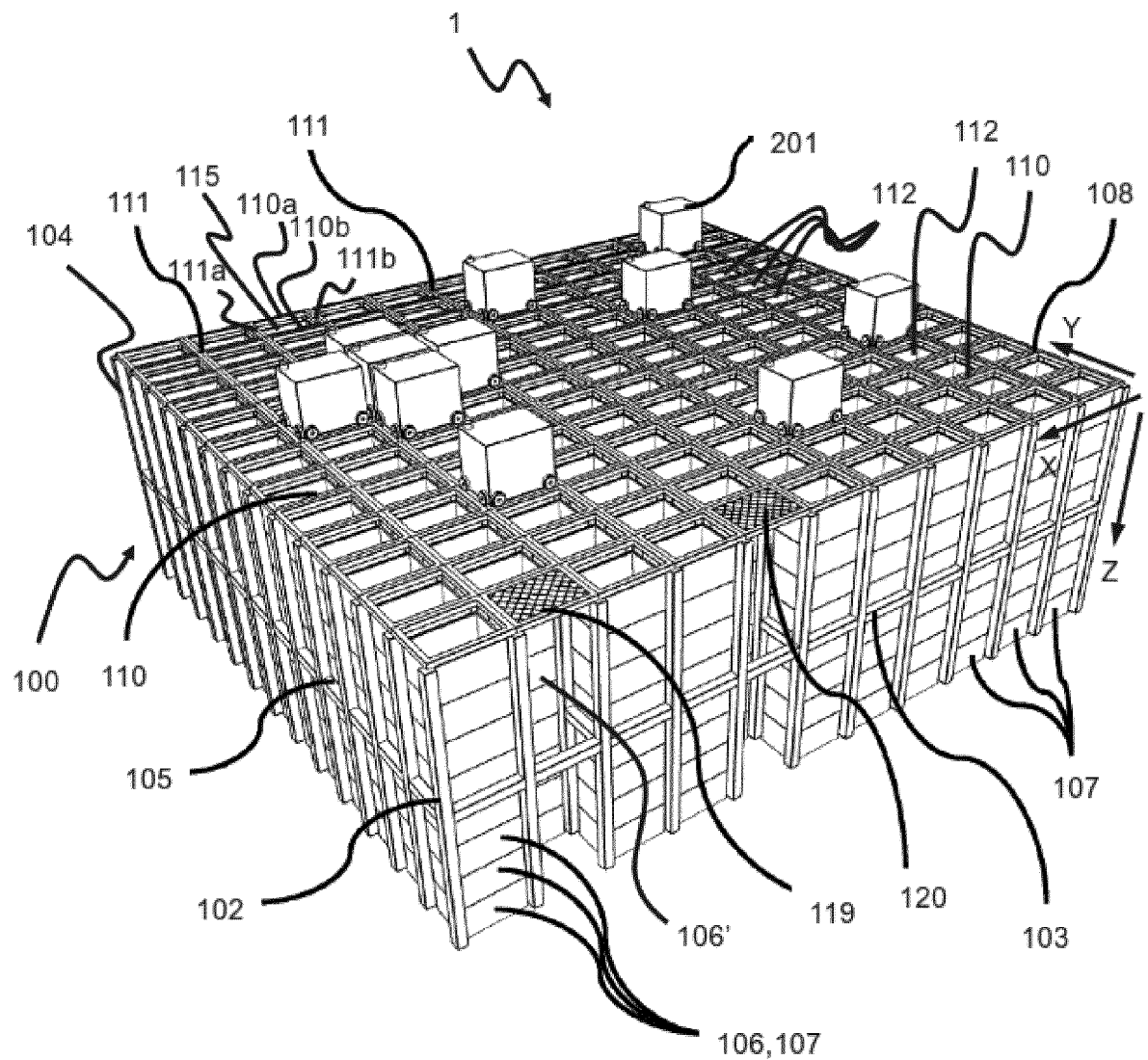
FIG. 1 is a perspective view of a grid of a prior art automated storage and retrieval system.

FIG. 1 is a perspective view of a grid of a prior art automated storage and retrieval system. It is disclosed a typical prior art automated storage and retrieval system 1 with a framework structure 100.

The framework structure 100 comprises several upright members 102 and several horizontal members 103 which are supported by the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107.

Figure 2:
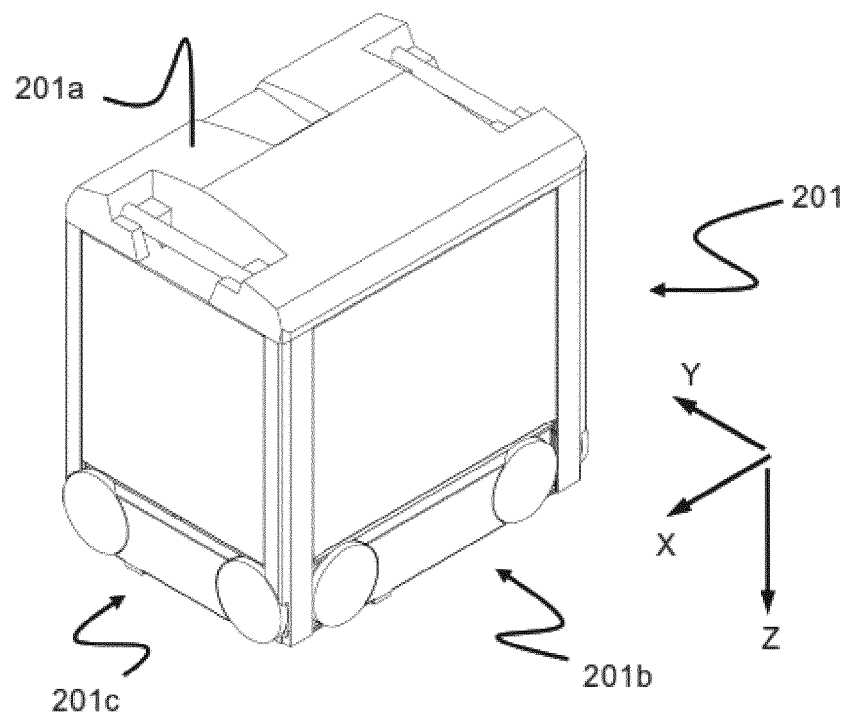
FIG. 2 is a perspective view of a prior art container handling vehicle having a centrally arranged cavity for containing storage containers therein.
Figure 3:
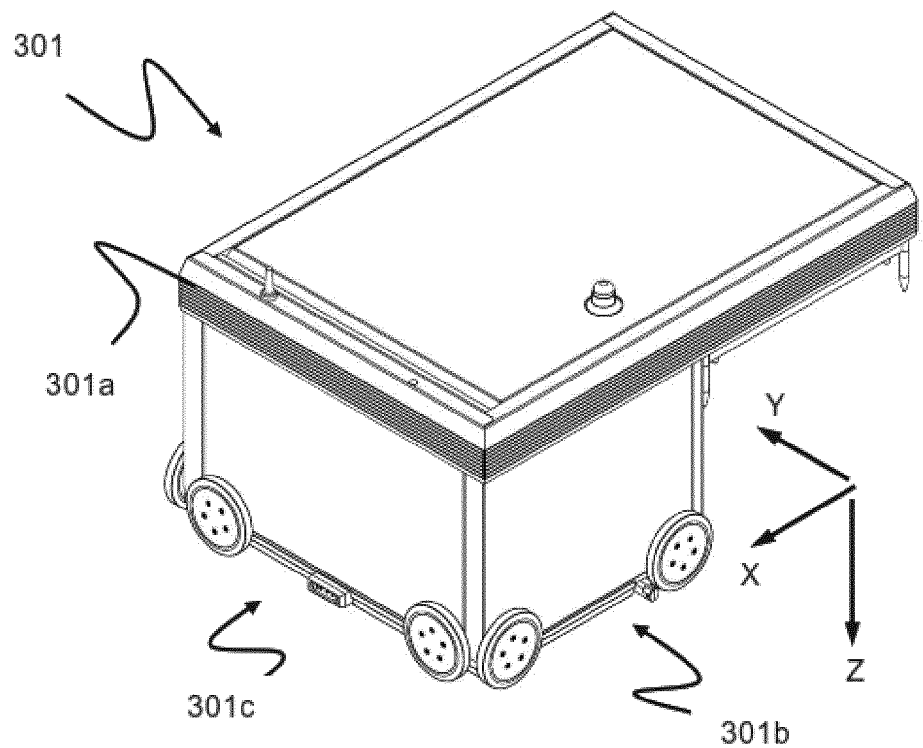
FIG. 3 is a perspective view of a prior art container handling vehicle having a cantilever for containing storage containers underneath.

FIG. 2 is a perspective view of a prior art container handling vehicle having a centrally arranged cavity for containing storage containers therein. FIGS. 2 and 3 discloses two different prior art container handling vehicles 201, 301 suitable for operating on such a system 1.

Each prior art container handling vehicle 201, 301 comprises a storage compartment or space for receiving and stowing a storage container 106 when transporting the storage container 106 across the rail system 108. The storage space may comprise a cavity arranged centrally within the vehicle body 201a.

FIG. 3 is a perspective view of a prior art container handling vehicle having a cantilever for containing storage containers underneath. It is shown an alternative configuration of a container handling vehicle 301 with a cantilever construction.

Figure 4:
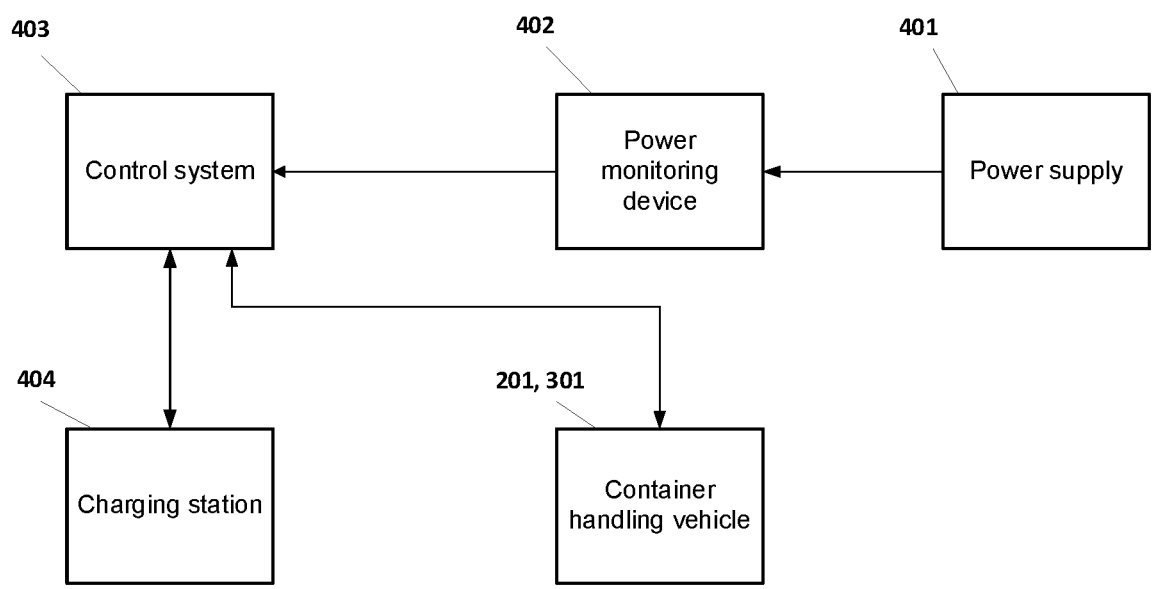
FIG. 4 is a box drawing of how the different parts of the system is connected.

FIG. 4 is a box drawing of how the different parts of the system are connected. A power supply 401 provides the storage system with power to operate. The power can come from an ordinary power grid or from locally deployed renewable power sources, or both. The locally deployed power sources are most likely solar cells, but they can also be wind turbines or water turbines.

A power monitoring device 402 is mounted to the power supply 401. The power monitoring device 402 constantly monitors the amount of available power from the grid. A reading of the amount of available power is sent to the control system 403. The control system 403 keeps track of whether there are certain periods during the day where the power supply 401 is not sufficient to power the entire system. If a period like this is expected, the control system 403 will adjust the power consumption of the system in order to not overload the power supply 401.

If the control system 403 receives information from the power monitoring device 402 that the power supply 401 is not sufficient, the control system 403 can modify the power consumption. The control system 403 can modify the power consumption by reducing the charging effect of the charging station(s) 404. If the charging station(s) 404 charge the batteries with reduced effect, the power consumption is reduced.

An alternative solution is to modify the speed of the container handling vehicles 201, 301. The reduction in speed ensures that the rechargeable batteries on the container handling vehicles 201, 301 last longer before having to be recharged. Alternatively, both these strategies can be used at the same time.

The power consumption can also be modified to accommodate for fluctuations in power prices during the day, e.g. if there are periods during the day when the prices are high.

An algorithm determines if one or both solutions to reduce the power consumption of the storage system is to be used, and the decision is based on the historical data of when the power supply is not sufficient and the information from the power monitoring device regarding the amount of power available.

These two different ways of reducing the power consumption can be used either to quickly reduce the power consumption to accommodate for a sudden unexpected drop in power availability, or they can be used to reduce the power consumption based on historical mapping of recurring periods for drops in power availability.

The two different techniques for reducing the power consumption can be used together or separately depending on the circumstances for the drop in available power. The algorithm determines which solution is to be used depending on different factors like drop in available power whether it is anticipated or not, the degree of severity and how long the surge has lasted or is expected to last.

One solution is to reduce the charging effect but maintain the operating speed of the container handling vehicles.

This solution results in a sudden drop in power consumption and is ideal for dealing with an unanticipated drop in power availability. Alternatively, this method can be used for dealing with a short and anticipated drop in power availability.

Alternatively, if there is a surplus of power available e.g. due to a windy day or a particularly sunny day, the surplus of power can be used to top up the rechargeable power sources.

As an alternative solution, both the reduction of the charging effect and the reduction in the speed of the container handling vehicle 201, 301 can be effectuated. This solution is effective if there is an anticipated drop in available power that is expected to last for a longer period of time, e.g. several hours.

A third alternative is to keep the charging effect of the charging station at 100% but reduce the speed of the container handling vehicles. This alternative is effective if there is an anticipated drop in available power where there is a need for having as many fully charged batteries ready as possible when the available power drops.

There is also a possibility of first reducing the power consumption of the charging station 404, and then thereafter reducing the speed of the container handling vehicles 201, 301 if the surge in power consumption is longer than anticipated.

As an additional possibility the container handling vehicles 201, 301 can reduce their speed and the charging station(s) 404 can reduce their charging effect after a while. This solution is preferable if there is an anticipated power drop that is expected to last for a long time. In this solution the container handling vehicles 201, 301 conserve their energy and the charging effect is maximized until the drop of power availability occurs.

In a preferred embodiment of the present invention the charging system comprises a plurality of chargers connected in a charging group. There can be several such charging groups in an entire system. A charging group is defined by a group of chargers connected to the same supply circuit.

The control system 403 can optimize and distribute the load between the charging groups. Further the control system can optimize and distribute the load inside a charging group by adjusting the charging profile of each charger. This is to optimize the use of the available power for each charging group. The available power is optimized based on known operations and tasks and future tasks given by experience data acquired from an experience model.

The optimization and distribution of the load between the charging groups is done by monitoring the available power for each charging group. This is done by communicating the available effect for the circuit that supplies the individual charging group. Alternatively, the available power can be set statistically for each charging group without regular updating of actual available power.

Further the energy requirement for each charger included in each charging group is monitored. The energy requirement will depend on whether the charger is active and where in the charging process it is. By evaluating the data from each charger, it is possible to estimate the future needed effect for the charger in question.

The system's current and future energy needs is evaluated. This is done based on the current energy level, the activity and future tasks for the system, current and future needs in the charging groups and the energy requirement for the system is based on experience models. Experience data is used to update the model.

The distribution of load between the charging groups is optimized by using current and estimated future energy needs for each single charge group to distribute new charge tasks between the groups.

The use within a charging group is optimized by adjusting the charging profile of each individual charger. The charging groups available power is continually monitored, and the available power is always distributed between the individual chargers. Here, the estimated future effect needed for each individual charger is also taken into account when adjusting the consumption internally in the charging group.

The control system will continuously update the experience model and the algorithms based on historical data.

Figure 5:
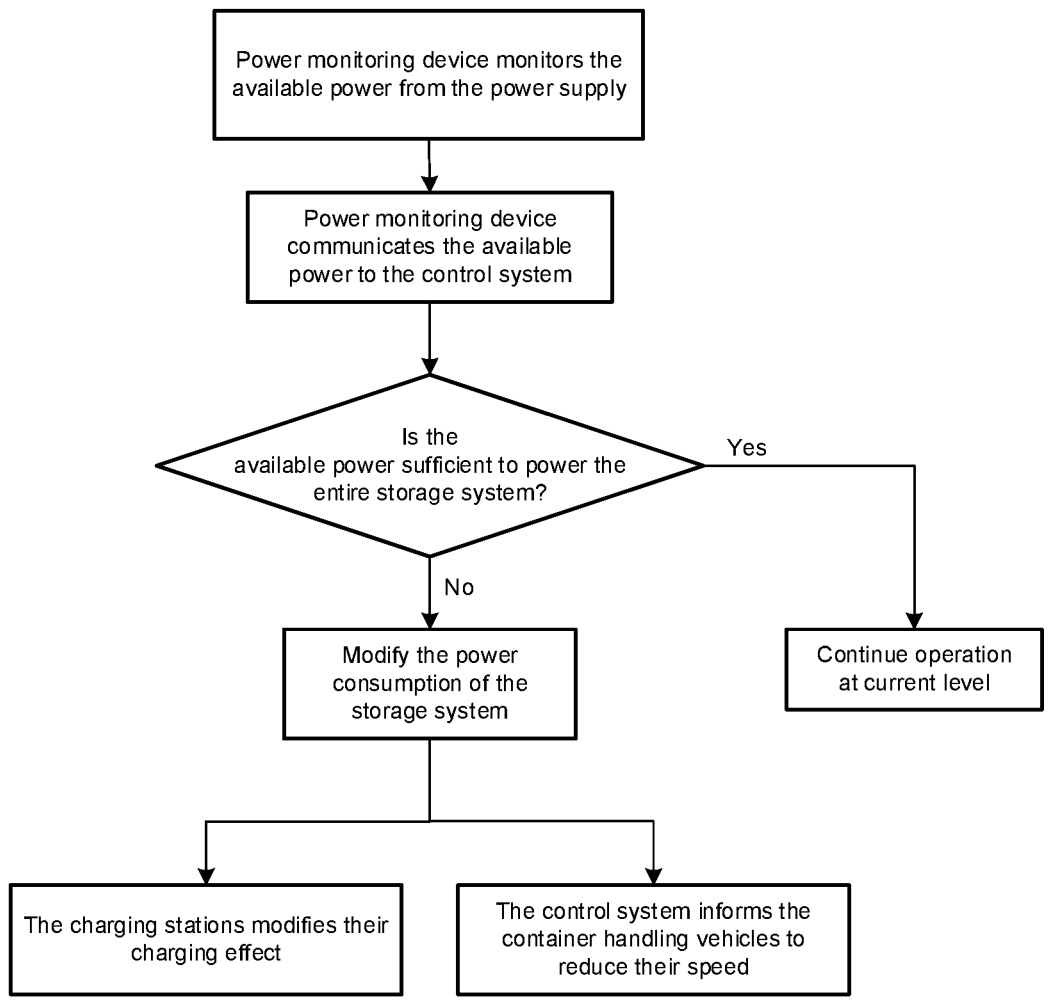
FIG. 5 is a flowchart of the process for monitoring and adjusting the power consumption according to the present invention.

FIG. 5 is a flowchart of the process for monitoring and adjusting the power consumption according to the present invention.

The power monitoring device 402 monitors the available power from the power supply 401. The power supply 401 can be either a power grid solution or local renewable power sources like solar cells or similar. Most likely the power supply 401 will either be power from the power grid or a combination of grid power and power from local renewable power sources.

The power monitoring device 402 communicates the available power to the control system 403. These data are stored in an experience model and provides the basis for how the control system handles future drops in available power. The control system 403 can execute measures both for handling a sudden drop in available power as well as anticipating future shortage of power.

The control system evaluates if the available power is sufficient to power the entire storage system. If it is sufficient, the operation continues at the current level. If it is not sufficient the control system can initiate actions for reducing the power consumption of the system.

These actions can be to modify the charging effect of the charging stations. In addition, the control system can modify the speed at which the container handling vehicles operate.

A modification in speed might be to reduce the speed of the container handling vehicles with up to 50% thus allowing a fully charged container handling vehicle to operate for twice as long without having to recharge the batteries.

Further the control system keeps track of the periods where there is a drop in available power. These data are stored in an experience model, so the control system can anticipate when there is a drop in available power in order to adjust the power consumption ahead of time.

In a preferred embodiment of the present invention the charging system is comprised by a plurality of chargers connected in a charging group. There can be several such charging groups in an entire system. A charging group is defined by a group of chargers connected to the same supply circuit.

The charging effect within a charging group can be optimized by having some chargers working with full capacity and allowing other chargers either to work with reduced capacity or completely shut off. The internal division of capacity is decided by the tasks the chargers are performing, but also the tasks that the chargers are intended to perform.

The distribution of the load between the different charging groups is done by monitoring the available power for each charging group and communicating the available effect for the circuit that supplies the individual charging groups.

Figure 6:
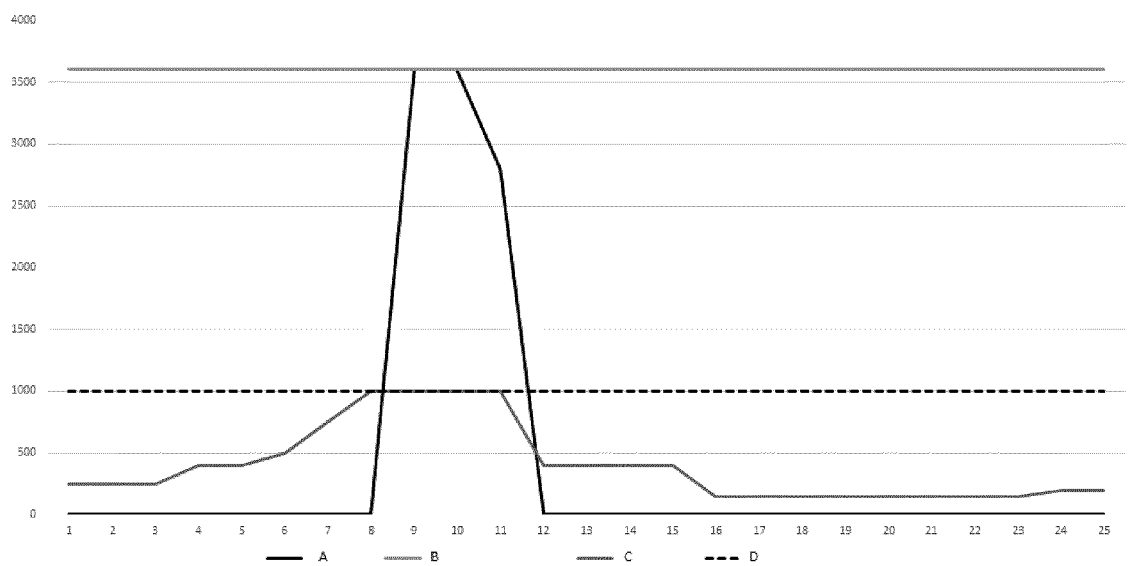
FIG. 6 is a diagram showing an example of the present invention in use.

FIG. 6 is a diagram showing an example of the present invention in use. In this example there is a storage system using three container handling vehicles. Each container handling vehicle has a 100 W effect. This results in a combined effect for all three container handling vehicles of 300 W. Due to peaks in operation during certain periods of the day, this system needs three chargers in order for all the container handling vehicles to be operational all the time. A typical charger has an effect of 1200 W. The system therefore needs to be dimensioned for handling 3600 W.

With no power management the system is dimensioned for 3600 W even though there are only certain periods during the day where there is actually a need for 3600 W. Dimensioning a system this way results in a substantial investment in power supply in addition to the storage system itself. If we now scale up the system to 400 container handling vehicles and 200 chargers the power supply needs to be dimensioned for 240 kW, it is easy to see how expensive this can be.

If we however use an experience model where experience data is used to update the model in order to anticipate when there is a surge in the need for power, we can adapt the charging strategy of the chargers to accommodate for these surges.

If we can use the experience model to anticipate the surges we can adapt the chargers charging strategy to start charging the batteries before the surge comes and to continue after the surge has passed. We are therefor able to spread the use of power over a longer period, and the power supply of the system can hence be dimensioned down.

In the three container handling vehicles example we can, by using an experience model, lower the charging effect to 1000 W and still maintain full operation the entire time. The cost of installing such a storage system is hence reduced greatly.

In the example shown in FIG. 6, the line A describes the need for power in a storage system without an experience model. Here we can see that the surge in need for power starts at 8 o'clock and lasts to 12 o'clock, with a peak from 9 o'clock to 10 o'clock. Line B represents the maximum amount of power the system can deliver, which is 3600 W.

The line C represent the need for power in the same system with an experience model controlling the charging strategy of the chargers. Here we see the use of power is spread out during the entire day with a peak of just 1000 W. Line D represent the maximum amount of power the system needs to deliver during the day with an experience model controlling the charging strategy of the chargers.

With this type of charging strategy, the user of the system can be forced to accept that there are certain periods during the day where the system cannot be fully operational as a consequence of the reduction in cost for installing and dimensioning the system. A reduction in speed of the container handling vehicles during certain periods of the day can be the result of the use of an experience model.

Machine learning and artificial intelligence can be used in order to maintain the experience model and control the charging strategy of the chargers.

The invention claimed is:

1. A control system for managing power consumption of an automated storage and retrieval system, the automated storage and retrieval system comprising:
   a container-handling vehicle, with a rechargeable power source, for handling storage containers in the automated storage and retrieval system;
   a charging station for recharging the rechargeable power source of the container-handling vehicle;
   a power supply for delivering power to the automated storage and retrieval system;
   a power monitoring device coupled to the power supply and arranged to monitor available power from the power supply and communicate a signal to the control system indicative of the available power;
   wherein the control system comprises a non-transitory readable memory storing instructions and a processor arranged to be responsive to that signal and manage the power consumption and configured to:
     determine, in response to the signal that the available power has dropped below a threshold level;
     determine an expected duration of time for the drop in the available power;
     in response to the power dropping below the threshold level, reduce a charging power of the charging station to reduce the power consumption of the container-handling vehicle and the charging station; and
     in response to the drop in the available power lasting longer than the expected duration of time, initiate a communication with the container-handling vehicle, causing a reduction in a speed of the container-handling vehicle.

2. The control system according to claim 1, wherein the control system is arranged to control a number of charging stations that are operational by reducing the number of charging stations during periods of lower power availability.

3. The control system according to claim 1, wherein the control system is configured to direct the container-handling vehicle to the charging station having highest charging capability during periods of lower power availability.

4. The control system according to claim 1, wherein the power supply is arranged for providing the power from local generated renewable energy and/or grid power.

5. A method for managing power consumption of an automated storage and retrieval system, the automated storage and retrieval system comprising a container-handling vehicle, with a rechargeable power source, for handling storage containers in the automated storage and retrieval system, a charging station for recharging the rechargeable power source of the container-handling vehicle, a power supply for delivering power to the automated storage and retrieval system, a power monitoring device coupled to the power supply, a control system for controlling operation of the automated storage and retrieval system, wherein the method comprises:
   monitoring available power from the power supply by the power monitoring device;
   communicating a signal to the control system indicative of the available power by the power monitoring device;
   determining, in response to the signal that the available power has dropped below a threshold level;
   determining an expected duration of time for the drop in the available power;
   in response to the power dropping below the threshold level, reducing a charging power of the charging station to reduce the power consumption of the container-handling vehicle and the charging station; and
   in response to the drop in the available power lasting longer than the expected duration of time, initiating a communication with the container-handling vehicle, causing a reduction in a speed of the container-handling vehicle.

6. The method according to claim 5, wherein the power consumption is managed by allowing the control system to adjust a number of charging stations that are operational.

7. The method according to claim 5, wherein power consumption is managed by allowing the control system to direct the container-handling vehicle to the charging station having highest charging capability.

8. The method according to claim 5, wherein the power consumption is managed by allowing the power supply to receive power from locally generated renewable energy and/or grid power.

9. An automated storage and retrieval system comprising:
   a control system for managing power consumption of the automated storage and retrieval system;
   a container-handling vehicle, with a rechargeable power source, for handling storage containers in the automated storage and retrieval system;
   a charging station for recharging the rechargeable power source of the container-handling vehicle;
   a power supply for delivering power to the automated storage and retrieval system;
   a power monitoring device coupled to the power supply and arranged to monitor available power from the power supply and communicate a signal to the control system indicative of the available power;
   wherein the control system comprises a processor is arranged to be responsive to that signal and manage power consumption and configured to:
     determine, in response to the signal that the available power has dropped below a threshold level;
     determine an expected duration of time for the drop in the available power;
     in response to the power dropping below the threshold level, reduce a charging power of the charging station to reduce power consumption of the container-handling vehicle and the charging station; and
     in response to the drop in available power lasting longer than the expected duration of time, initiate a communication with the container-handling vehicle, causing a reduction in a speed of the container-handling vehicle.

* * * * *